United States Patent Office 3,135,760
Patented June 2, 1964

3,135,760
1 - ALLYL - 4 - PHENYL - 4 - CARBALKOXY - PIPERIDINES AND THEIR ACID ADDITION SALTS
Karl Zeile, Herbert Merz, and Kurt Freter, Ingelheim (Rhine), Germany, assignors to Boehringer Ingelheim Gesellschaft mit beschrankter Haftung, Ingelheim (Rhine), Germany, a corporation of Germany
No Drawing. Filed May 27, 1963, Ser. No. 283,547
5 Claims. (Cl. 260—294.3)

This is a continuation-in-part of copending applications Serial Nos. 174,412 and 174,386, each filed February 20, 1962, both now abandoned.

This invention relates to novel piperidine derivatives and their acid addition salts, as well as to methods of preparing these piperidine compounds and their acid addition salts.

More particularly, the present invention relates to the 1-allyl-4-phenyl-4-carbalkoxy-piperidines of the formula

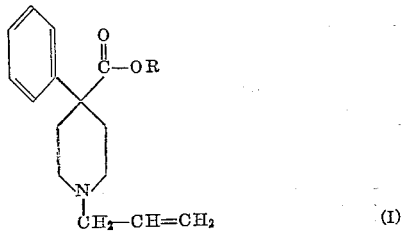

wherein R is selected from the group consisting of methyl and propyl, and their acid addition salts, especially their non-toxic, pharmacologically acceptable acid addition salts.

The compounds of the Formula I above may be prepared by a number of different methods which are well known in principle. However, the following methods have proved to be especially advantageous:

*Method A.*—Reaction of a 4-phenyl-4-carbalkoxy-piperidine with an allyl halide according to the following reaction formula

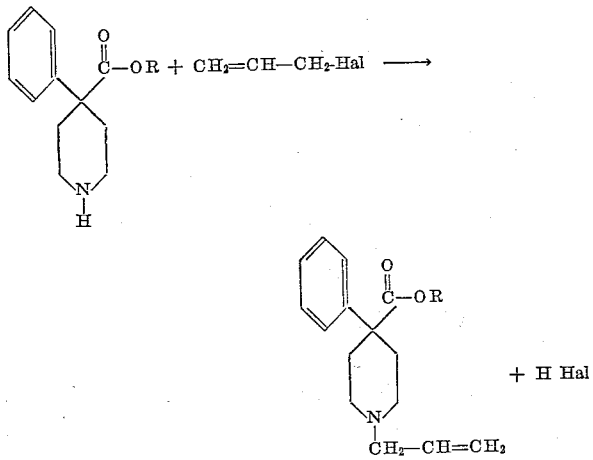

wherein R has the meanings previously defined and Hal is a halogen, especially chlorine or bromine.

The reaction is preferably carried out in an inert organic solvent and in the presence of a weak base, such as sodium bicarbonate, at temperatures between 50 and 150° C. The reagents may be reacted with each other in a molar relationship of 1:1. Preferably, however, the allyl halide is used in excess.

*Method B.*—Reaction of a 3-phenyl-3-carbalkoxy-1,5-dihalopentane with allylamine according to the following reaction formula

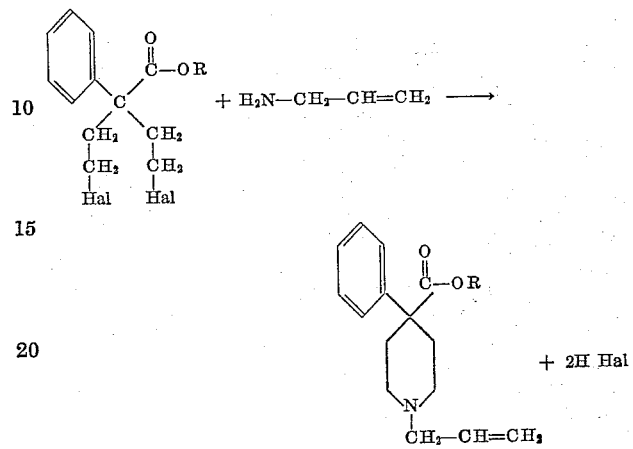

wherein R has the meanings previously defined and Hal is a halogen, preferably chlorine or bromine.

The reaction is preferably carried out in an inert organic solvent and in the presence of a basic condensation agent, such as sodium carbonate or dimethylamine, at temperatures between 50 and 150° C.

*Method C.*—Reaction of benzylcyanide with a tertiary β,β-dihalogenethyl-allylamine in the presence of sodium amide as condensation agent according to the following reaction formula

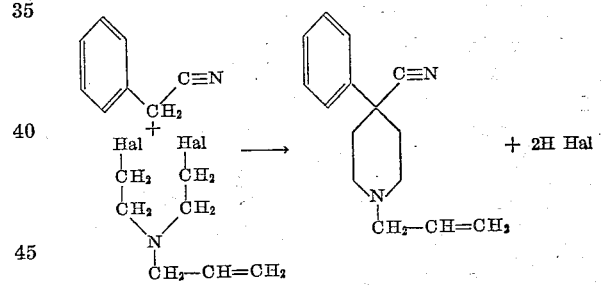

wherein Hal is a halogen, preferably chlorine or bromine.

The reaction is preferably carried out in the presence of powdered sodium amide and in an inert organic solvent, such as toluene, at temperatures between 50° and 200° C. Thereafter, the resulting 1-allyl-4-cyano-4-phenyl-piperidine is reacted with hydrogen bromide to convert the cyano group into a free carboxyl group. The resulting 1-allyl-4-phenyl-4-carboxy-piperidine hydrobromide is esterified with methanol or propanol in the presence of concentrated sulfuric acid to yield the desired 1-allyl-4-phenyl-4-carbalkoxy-piperidine hydrobromide.

The free 1-allyl-4-phenyl-4-carbalkoxy-piperidines obtained pursuant to Methods A and B may, if desired, be transformed into their non-toxic acid addition salts by customary methods, that is, by acidification with the appropriate acid having a non-toxic anion. Similarly, the hydrobromide obtained pursuant to Method C may, if desired, be transformed into other non-toxic acid addition salts by acidification with the appropriate acid having a non-toxic anion. In addition to hydrobromic acid, examples of other suitable acids for this conversion are sulfuric acid, hydrochloric acid, methane-sulfonic acid, tartaric acid, citric acid and the like, which respectively yield the non-toxic, pharmacologically acceptable sulfate, hydrochloride, methane-sulfonate, tartrate, citrate and so forth, of the 1-allyl-4-phenyl-4-carbalkoxy piperidines.

The following examples shall further illustrate the present invention and enable others skilled in the art to understand it more completely. It should be understood, however, that the present invention is not limited to the particular embodiments of these examples.

EXAMPLE I

*Preparation of 1-Allyl-4-Phenyl-4-Carbomethoxy-Piperidine and its Hydrobromide*

2.2 gm. (0.010 mol) of 4-phenyl-4-carbomethoxy-piperidine were dissolved in 20 ml. of ethanol. 0.95 gm. (0.011 mol) of sodium bicarbonate and 1.33 gm. (0.011 mol) of allyl bromide were added to the resulting solution, and the mixture was refluxed for one hour, accompanied by stirring. After cooling, the alcoholic reaction solution was filtered and the alcohol was evaporated in vacuo. The evaporation residue, which consisted of 1-allyl-4-phenyl-4-carbomethoxy-piperidine having a boiling point of about 150° C./0.1 mm. Hg was acidified with 2 N hydrobromic acid. The hydrobromide of 1-allyl-4-phenyl-4-carbomethoxy-piperidine precipitated out. After recrystallization of the precipitate from water, 3.05 gm. (90% of the theoretical amount) of 1-allyl-4-phenyl-4-carbomethoxy-piperidine hydrobromide were obtained. The product had a melting point of 209–211° C. and the formula

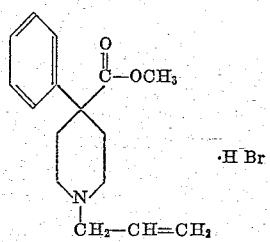

EXAMPLE II

*Preparation of 1-Allyl-4-Phenyl-4-Carbopropoxy-Piperidine and its Hydrobromide*

2.4 gm. (0.010 mol) of 4-phenyl-4-carbopropoxy-piperidine were dissolved in 20 ml. of ethanol. 0.95 gm. (0.011 mol) of sodium bicarbonate and 1.21 gm. (0.010 mol) of allyl bromide were added to the resulting solution, and the mixture was refluxed for one hour, accompanied by stirring. After cooling, the alcoholic reaction solution was filtered and the alcohol was evaporated in vacuo. The evaporation residue, which consisted of 1-allyl-4-phenyl-4-carbopropoxy-piperidine having a boiling point of about 170° C./0.1 mm. Hg was acidified with 2 N hydrobromic acid. The hydrobromide of 1-allyl-4-phenyl-4-carbopropoxy-piperidine precipitated out. After recrystallization of the precipitate from water, 3.3 gm. (90% of the theoretical amount) of 1-allyl-4-phenyl-4-carbopropoxy-piperidine hydrobromide were obtained. The product had a melting point of 149–150° C. and the formula

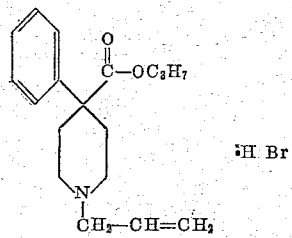

The 1-allyl-4-phenyl-4-carbalkoxy piperidines of the Formula I above and their non-toxic, pharmacologically acceptable acid addition salts have useful pharmacodynamic properties. More particularly, the compounds according to the present invention exhibit highly effective analgesic activities and at the same time pronounced morphine-antagonistic effects. Thus, they exhibit pharmacodynamic activities which are unexpectedly and surprisingly different in kind from those of the adjacent homolog 1-allyl-4-phenyl-4-carbethoxy-piperidine hydrochloride described by D. J. Costa and D. D. Bonnycastle in Journal of Pharmacology and Experimental Therapeutics, vol. 113, pp. 310 et seq. (1955). The prior art compound exhibits no morphine-antagonistic activity whatsoever and a very low analgesic activity.

The high morphine-antagonistic activity of the 1-allyl-4-phenyl-4-carbalkoxy-piperidines of the present invention is effectively demonstrated by the following pharmacological tests. A statistically significant number of adult white mice were administered 15 mgm./kg. body weight of morphine by injection, that is, the $ED_{50}$ of morphine (dose which produces an analgesic effect in 50% of the mice, as determined by the Haffner method). Thereafter, the mice were injected with varying amounts of 1-allyl-4-phenyl-4-carbomethoxy-piperidine hydrobromide and the corresponding 4-carbopropoxy compound, respectively. After a short time interval to allow the injections to take effect, the mice were tested for detectable analgesia. The following tables show the results.

TABLE I

| Amount of 1-allyl-4-phenyl-4-carbomethoxy-piperidine hydrobromide injected, mgm./kg. body weight | Percentage of mice with detectable analgesia, percent |
|---|---|
| 50 | 0 |
| 10 | 0 |
| 5 | 0 |
| 1.0 | 20 |
| 0.5 | 30 |
| 0.1 | 40 |

TABLE II

| Amount of 1-allyl-4-phenyl-4-carbopropoxy-piperidine hydrobromide injected, per kg. body weight | Percentage of mice with detectable analgesia, percent |
|---|---|
| 50 mg./kg. | 0 |
| 1 mg./kg. | 0 |
| 0.1 mg./kg. | 20 |
| 0.01 mg./kg. | 20 |
| 1 γ/kg. | 10 |
| 0.1 γ/kg. | 10 |

None of the animals showed any evidence of toxic symptoms incident to analgesic doses of morphine. Moreover, all animals survived a subcutaneous injection of 200 mgm./kg. of 1-allyl-4-phenyl-4-carbopropoxy-piperidine hydrobromide or 1-allyl-4-phenyl-4-carbomethoxy-piperidine hydrobromide without toxic symptoms.

By virtue of this morphine-antagonistic activity, the piperidine compounds of the present invention and their non-toxic acid addition salts may be employed in conjunction with known central analgesics, such as morphine, meperidine and methadone, to prevent respiratory depression without interference with the analgesic effects. For this purpose the piperidine compounds according to the present invention or their non-toxic acid addition salts may, for instance, be incorporated into injectable isotonic solutions of morphine, meperidine, methadone or the like in amounts of 0.01–0.1 mgm. per ml. of solution. However, the piperidine compounds of the present invention or their non-toxic acid addition salts may also be used as the sole analgesic ingredients in conjunction with an inert carrier in a dosage unit composition, such as a sterile, injectable isotonic solution in ampules.

Under these circumstances, the effective dosage of the piperidine compounds or their acid addition salts is also from 0.01–0.1 gm.

The following are illustrative examples of dosage unit hypodermic solutions in ampule form comprising a non-toxic acid addition salt of 1-allyl-4-phenyl-4-carbopropoxy-piperidine or 1-allyl-4-phenyl-4-carbomethoxy-piperidine as the morphine-antagonistic ingredient:

(a)

| | Mgm. |
|---|---|
| 1-allyl-4-phenyl-4-carbopropoxy-piperidine hydrobromide | 0.1 |
| Morphine·HCl | 20.0 |
| 0.001 N HCl, q.s. ad. 1 ml. | |

(b)

| | Mgm. |
|---|---|
| 1-allyl-4-phenyl-4-carbopropoxy-piperidine hydrobromide | 0.05 |
| Meperidine hydrochloride | 100.00 |
| Distilled water, q.s. ad. 2 ml. | |

(c)

| | Mgm. |
|---|---|
| 1-allyl-4-phenyl-4-carbopropoxy-piperidine hydrobromide | 0.1 |
| Methadone hydrochloride | 10.0 |
| Distilled water, q.s. ad. 2 ml. | |

(d)

| | Mgm. |
|---|---|
| 1-allyl-4-phenyl-4-carbomethoxy-piperidine hydrobromide | 1.0 |
| Morphine·HCl | 20.0 |
| 0.001 N HCl, q.s. ad. 1 ml. | |

(e)

| | Mgm. |
|---|---|
| 1-allyl-4-phenyl-4-carbomethoxy-piperidine hydrobromide | 0.5 |
| Meperidine hydrochloride | 100.0 |
| Distilled water, q.s. ad. 2 ml. | |

(f)

| | Mgm. |
|---|---|
| 1-allyl-4-phenyl-4-carbomethoxy-piperidine hydrobromide | 0.5 |
| Methadone hydrochloride | 5.0 |
| Distilled water, q.s. ad. 1 ml. | |

While we have illustrated our invention with the aid of certain specific embodiments, it will be readily apparent to those skilled in the art that the present invention is not limited to these specific embodiments and that various changes and modifications may be made without departing from the spirit of the invention or the scope of the appended claims.

We claim:

1. A compound selected from the group consisting of 1-allyl-4-phenyl-carbalkoxy-piperidines of the formula

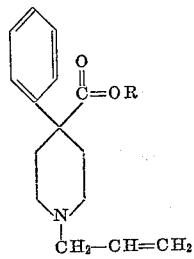

wherein R is selected from the group consisting of methyl and propyl, and their non-toxic, pharmaceutically acceptable acid addition salts.

2. 1-allyl-4-phenyl-4-carbomethoxy-piperidine.
3. 1-allyl-4-phenyl-4-carbomethoxy-piperidine hydrobromide.
4. 1-allyl-4-phenyl-4-carbopropoxy-piperidine.
5. 1-allyl-4-phenyl-4-carbopropoxy-piperdine hydrobromide.

No references cited.

UNITED STATES PATENT OFFICE
CERTIFICATE OF CORRECTION

Patent No. 3,135,760  June 2, 1964

Karl Zeile et al.

It is hereby certified that error appears in the above numbered patent requiring correction and that the said Letters Patent should read as corrected below.

Column 6, line 16, for "-carbalkoxy-" read -- -4-carbalkoxy- --; lines 18 to 27, the formula should appear as shown below instead of as in the patent:

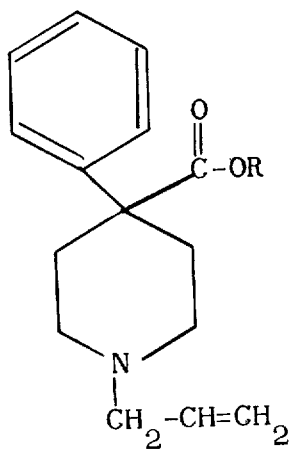

Signed and sealed this 3rd day of November 1964.

(SEAL)
Attest:

ERNEST W. SWIDER
Attesting Officer

EDWARD J. BRENNER
Commissioner of Patents